(12) United States Patent
Brunswig et al.

(10) Patent No.: US 8,056,091 B2
(45) Date of Patent: Nov. 8, 2011

(54) SYSTEMS AND METHODS FOR USING APPLICATION SERVICES

(75) Inventors: Frank Brunswig, Heidelberg (DE);
Michael Falk, Heidelberg (DE); Malte Christian Kaufmann, Walldorf (DE);
Prasad Natu, Bangalore (IN); Dinu Pavithran, Bangalore (IN); Frank Rakowitz, Karlsruhe (DE); Rituparna Sengupta, Karlsruhe (DE); Tihomir Stoyanov, Plevon (BG)

(73) Assignee: SAP AG, Walldorf (DE)

( * ) Notice: Subject to any disclaimer, the term of this patent is extended or adjusted under 35 U.S.C. 154(b) by 1012 days.

(21) Appl. No.: 11/485,643

(22) Filed: Jul. 13, 2006

(65) Prior Publication Data
US 2008/0016516 A1    Jan. 17, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/315

(58) Field of Classification Search ............. 719/315
See application file for complete search history.

(56) References Cited

U.S. PATENT DOCUMENTS

| | | | |
|---|---|---|---|
| 2002/0038336 A1* | 3/2002 | Abileah et al. | 709/203 |
| 2002/0169842 A1* | 11/2002 | Christensen et al. | 709/206 |
| 2003/0018832 A1* | 1/2003 | Amirisetty et al. | 709/328 |
| 2003/0191677 A1* | 10/2003 | Akkiraju et al. | 705/8 |
| 2005/0015619 A1* | 1/2005 | Lee | 713/201 |
| 2006/0069774 A1* | 3/2006 | Chen et al. | 709/225 |

* cited by examiner

*Primary Examiner* — Andy Ho
*Assistant Examiner* — Timothy A. Mudrick
(74) *Attorney, Agent, or Firm* — Mintz, Levin, Cohn, Ferris, Glovsky & Popeo, P.C.

(57) ABSTRACT

Methods and apparatus, including computer program products, are provided for executing, by a first framework, a service provided by a second framework. The method may include initiating, by the first framework, a request to access the service provided by the second framework. The method may also include identifying metadata for the service, the metadata being stored in a metamodel runtime repository. The method may further include translating the metadata into a format that the first framework can use to invoke the service and executing, using the translated metadata, the service provided by the second framework.

15 Claims, 5 Drawing Sheets

SYSTEMS AND METHODS FOR USING APPLICATION SERVICES

TECHNICAL INVENTION

The present invention generally relates to software-based applications and environments. More particularly, the invention relates to methods and systems for allowing a software platform to use the functionality provided by another software platform where, for example, the platforms are separate or distinct.

BACKGROUND INFORMATION

Software applications are used by individuals and companies for a variety of purposes. Software applications may be distributed, such that a portion of the software executes at a user site, also known as "front-end," and a portion of the software executes at a remote location, such as a server or a "back-end." Further, software applications may provide a number of services, which may be used to perform a specific function. A service, such as a Web service or program, represents a piece of application functionality that can be found and accessed by other applications. A service may be self-describing because all the information on how to use the service can be obtained from the service itself, which may be centrally stored.

Services receive input parameters that are used to execute the services' functionality. For example, a service for retrieving a destination of a flight must receive an input parameter indicating the flight number. Using the flight number, the service, which may be located at a back-end, may determine the destination by, for example, searching a database.

Companies often use multiple software applications to handle their business needs. For example, a company may use a first software application to handle accounting, a second software application to retrieve information on customers, and a third software application to maintain records. Each software application may execute services at a front-end and a back-end. In certain cases, a user that is working with a first software application may want to use a service provided by a second software application. For example, a user that wants to generate a bill with an accounting system may want to lookup a customer's address using a service offered by a second software application.

Software applications and their services may be spread across different frameworks on a back-end. A framework is a system having one or more processors that can execute computer-readable program code to make classes of transactions accessible to a system or other frameworks. A first framework may be, for example, a stateful framework, which may include stateful software applications that maintain the context after each request to the back-end. A context may be the state of an application or service, and may be stored using, for example, cookies on a local computer. Assume that a user is entering data into a form, which may divided into several parts or "screens." After a user enters data on the first screen, the user may select to move to the next screen and continue entering data. A stateful software application may store the entered data from several screens at the user's local site using cookies. The stateful software application may then transmit the entered data to a back-end server in a group.

A second framework may include stateless software applications that release the context after each request to the back-end. Assuming that a user enters data into a form including multiple screens, the context may be released after each screen. That is, after a user completes the first screen, the entered data may be transmitted to a back-end server for storing, but the entered data may not be stored locally.

Software applications that are provided by a first framework typically cannot execute services of software applications offered by a different framework. Software applications and the services implemented by the software applications require specific input parameters, such as the flight number to determine the flight destination. Moreover, the service may have a unique name and require that the input parameters be formatted in a particular manner. Further, each framework may use different service interfaces for accessing and executing the services. The service interfaces and frameworks may be based on different programming languages, such as Java and C++. Because the first software application running on a first framework is not aware or able to access the interface on the second framework, or the second software application's service name, required input parameters, and/or formatting of the required input parameters, the first software application typically cannot execute services of a second software application on a second framework.

Accordingly, a need exists for solutions that allow software applications to execute services of other software applications on a different framework.

SUMMARY

Embodiments of the invention relate to systems and methods, including computer program products, for allowing software applications to use the services of other software applications where, for example, the applications are provided by different frameworks.

In accordance with one embodiment, an exemplary method may execute, by a first framework, a service provided by a second framework. The method may include initiating, by the first framework, a request to access the service provided by the second framework. The method may also include identifying metadata for the service, the metadata being stored in a metamodel runtime repository. The method may further include translating the metadata into a format that the first framework can use to invoke the service and executing, using the translated metadata, the service provided by the second framework.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
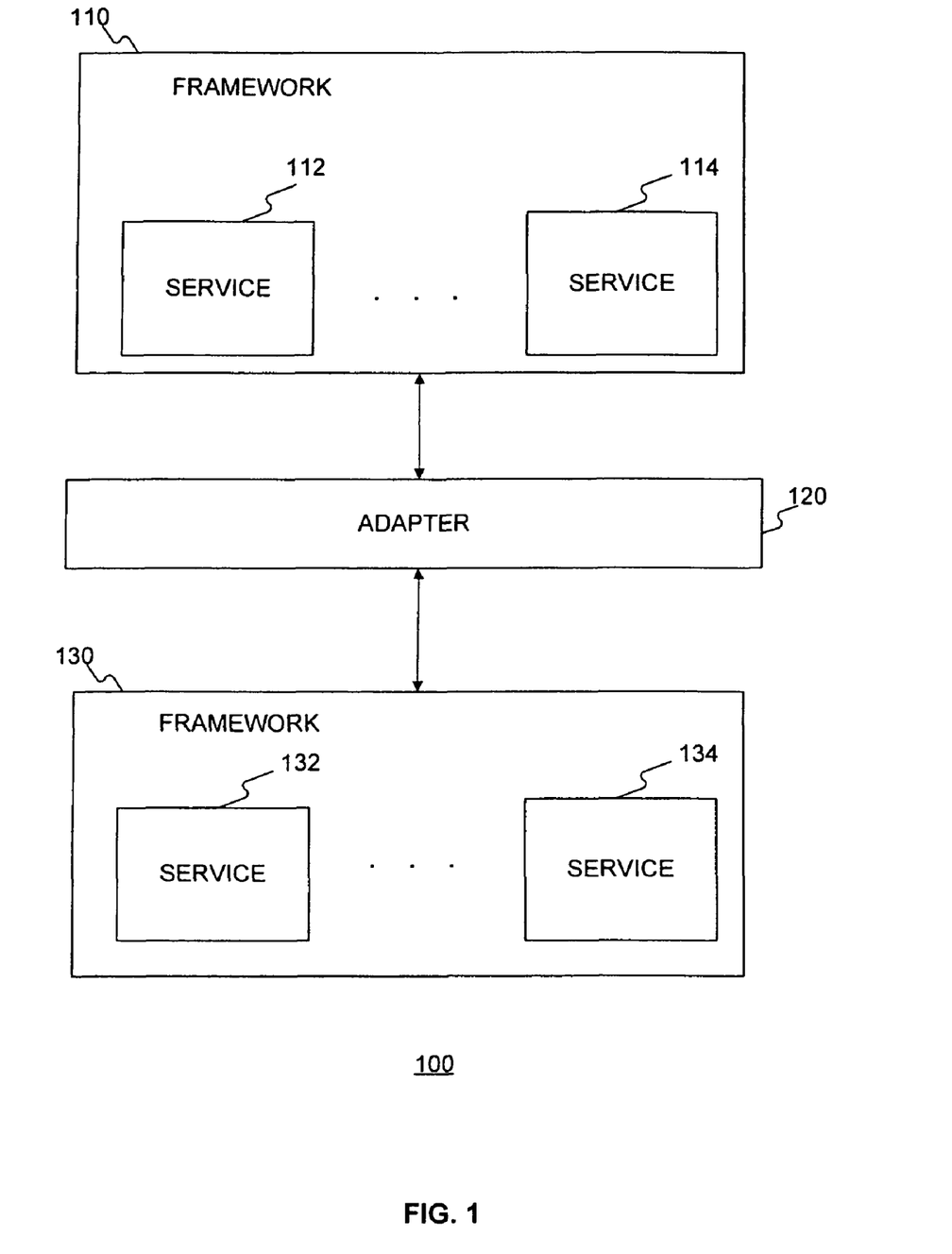
FIG. 1 illustrates a block diagram of an exemplary system 100, consistent with certain aspects related to the present invention.

FIG. 1 illustrates a block diagram of an exemplary system 100, consistent with an embodiment of the invention. As shown in FIG. 1, system 100 includes a framework 110 with one or more services 112-114, an adapter 120, and a framework 130 with one or more services 132-134.

Framework 110 and framework 130 may include similar services, as well as services that are unique. An example of similar services is a service 112 for a "find" operation and a service 132 for a "query" operation, both of which may be configured to retrieve a set of data from memory. An example of unique services is a service 114 for an "archive" operation and service 134 for a "simulate" operation. These services are exemplary only, as framework 110 and 130 may offer a plurality of services. Furthermore, the services offered by framework 110 may not have a direct one-to-one correspondence to services offered by framework 130. For example, service 112 may implement functionality on framework 110 that is similar to the combination of functionality provide by services 132 and 134 on framework 130.

Each service may have a unique name and receive one or more unique input parameters. Because framework 130 may define an interface to service 132, including a unique name and unique input parameters to service 132, framework 110 may not be able to invoke service 132 directly. The same is true for services hosted on framework 110 which may need to be invoked by services developed on framework 130.

Adapter 120 may facilitate allowing services on framework 110 to execute services on framework 130 or vice versa. By way of example, adapter 120 may adapt a request from a service on framework 110 to execute a service on framework 130 into a format that framework 130 can use to identify the requested service. In this manner, adapter 120 may allow framework 110 to identify and execute services offered by framework 130. For instance, a service offered on framework 110 may need to execute the "query" service 132 offered by framework 130 in order to retrieve data stored in a database using framework 130. Framework 110 may provide a request to adapter 120 in a format of a similar service, such as "find" service 112. Adapter 120 may change the request from a "find" to a "query," and generate the appropriate parameters required for the "query" service 132 of framework 130.

Framework 110, adapter 120, and framework 130 may be located at a back-end, a front-end, or distributed across system 100. In one embodiment, framework 110 may be, for example, an enterprise services framework. An enterprise services framework allows services, such as web applications, to be aggregated to form composite business-level applications. Framework 130 may be, for example, a composite application framework, which may provide a development environment for building applications.

In the exemplary embodiment of FIG. 1, adapter 120 is illustrated as a single unit, but may be implemented as a plurality of components as described below. With this background, greater detail will now be provided to exemplary systems and methods consistent with the present invention.

Figure 2:
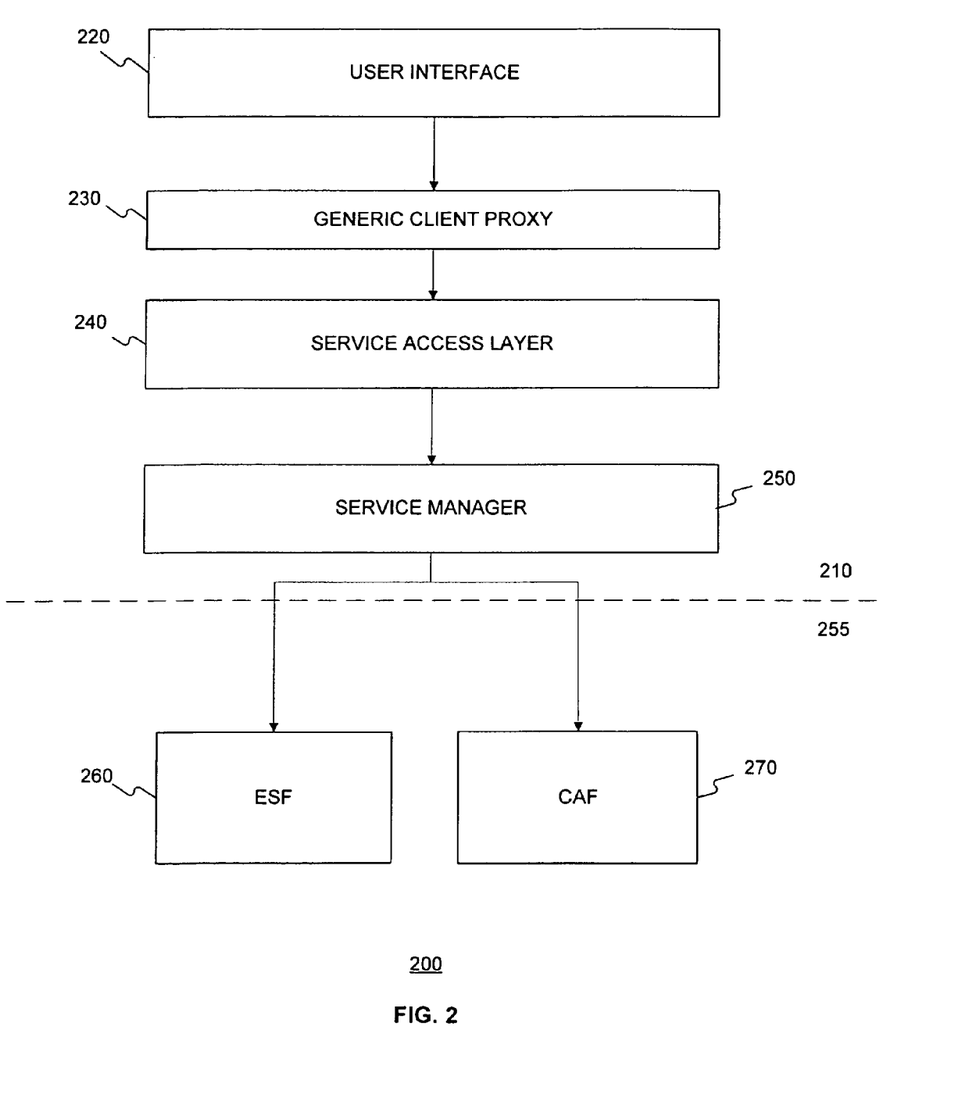
FIG. 2 illustrates a detailed block diagram of another exemplary system 200, consistent with certain aspects related to the present invention.

FIG. 2 illustrates a detailed block diagram of another exemplary system 200, consistent with an embodiment of the invention. System 200 includes both a front-end 210 and a back-end 255. Front-end 210 includes a user interface 220, a generic client proxy 230, a service manager 250, and a service access layer 240. Back-end 255 includes one or more software application frameworks, such as application frameworks 260 and 270 (described below).

System 200 may include client computers capable of executing applications (also referred to as programs). Client computers may have one or more processors, such as a personal computer. Further, user interface 220 and generic client proxy 230 may be implemented within a client.

The elements of system 200 may be connected using network connections, which may include, alone or in any suitable combination, a telephony-based network, a local area network (LAN), a wide area network (WAN), a dedicated intranet, wireless LAN, the Internet, a wireless network, a bus, or any other any communication mechanisms. Further, any suitable combination of wired and/or wireless components and systems may be used to provide network connections using bi-directional, unidirectional, and/or dedicated communication links.

System 200 may allow a stateless application to execute services of a stateful application. An example of a software application that uses stateful functionality is the Enterprise Services Framework (ESF) 260 (commercially available from SAP AG Walldorf, Germany). An enterprise may be a business system that extracts, produces, and distributes goods and services. ESF 260 is a type of computer framework, such as a client-server architectural framework, that includes one or more services. The services are accessible to other parts of the ESF, such as client systems and their corresponding users, through a communication mechanism such as the Internet or an intranet. ESF 260 may execute services located on a single back-end, such as retrieving information from a database and storing information in a database.

An example of a software application that uses stateless functionality is the Composite Application Framework (CAF) 270 (commercially available from SAP AG Walldorf, Germany). CAF 270 may provide a development environment for building applications. CAF 270 may delete the input parameters needed to execute services, and the relationships between the input parameters, after the service is used. In this manner, CAF 270 may release the context after each request to execute a service.

CAF 270 may use data from different back-ends to execute a service and may use create, read, update, and/or delete functions. Create, read, update, and/or delete functions may be implemented by every CAF service located on back-end 255 that is to be exposed to front-end 210. "Create" may refer to the process of creating a new object on back-end 255. "Read" may refer to reading data from back-end 255. "Update" may refer to updating existing data in an object on a back-end 255. "Delete" may refer to deleting data that is stored on a back-end 255.

For example, a CAF service may use create, read, update, and delete functions to provide a form that a user completes when purchasing a product over the Internet. When the user selects to checkout, the form may be created using the create behavior. In this example, the back-end may create a new object, such as a form, for the user. The form may be auto-completed if the back-end already stored some of the information necessary to complete the form, such as the user's shipping address. However, assume that the user has moved. In this case, the user may update his or her address in the form, and the user interface 220 may transmit this information to back-end 255, which will update the existing shipping address. In addition, the user may have cancelled a credit card, and so back-end 255 may delete the stored credit card information.

Front-end 210 may be based on ESF and may be executed using a Java engine and ESF metadata. Metadata comprise data about data. For example, metadata may describe the origin, history, and other aspects of data. More specifically, metadata may describe the name of services, input parameters to the services, operations of services, format of the input parameters, and relationships between services. System 200 may allow an application running on a stateless software framework, such as CAF 270, to be used within a stateful framework, such as ESF 260.

User interface 220 may serve as an interface for a user to execute one or more software applications. User interface 220 may allow users to interact with applications, such as services and web services, through generic client proxy 230. In one embodiment, user interface 220 may comprise a program capable of being executed by a client computer, such as Web Dynpro (commercially available from SAP AG, Walldorf, Germany).

Generic client proxy 230 may provide messaging capabilities, including automatic propagation of messages between a back-end 255 and user interface 220. When a user through user interface 220 requests information or seeks to execute a service of a software application at back-end 255, such as to execute a "query" operation, the information or service may be provided through generic client proxy 230. In this manner, generic client proxy 230 may enable communication with back-end 255, including retrieval of metadata from back-end 255. If, for example, a user requests a service provided by CAF 270, generic client proxy 230 may retrieve from back-end 255 the metadata required to initialize the requested service. Generic client proxy 230 may include an application program interface, which may be implemented using a model-based run-time environment, one example of which is Advanced Business Application Programming (ABAP), a programming language commercially available from SAP AG, although any other environment may be used.

Service access layer 240 may establish a connection with back-end 255 and may control retrieval of metadata from back-end 255. If back-end 255 contains a plurality of servers, service access layer 240 may identify the appropriate server to access. Upon receipt of data from back-end 255, services access layer 240 may translate the data into, for example, enterprise data objects. An enterprise data object may be a data container, such as a Java data bean, which are objects needed by generic client proxy 230. Data containers may be used to hold information for an application from back-end 255, such that generic client proxy 230 may identify the appropriate graphics to provide to user interface 220.

Service manager 250 may convert data coming from back-end 255 into enterprise data objects, which may be used by generic client proxy 230 to build the user interface 220. An enterprise data object may be a data container that may be used to provide model data from service access layer 240 to generic client proxy 230 in a format that generic client proxy 230 can utilize. Service manager 250 may be spread across both front-end 240 and back-end 255.

Back-end 255 may include, for example, one or more servers which may include one or more processors, such as a computer, with software applications and frameworks. As illustrated in FIG. 2, two exemplary software application frameworks are ESF 260 and CAF 270. Back-end 255 may also include additional components of a distributed system architecture, such as an integration and application platform, databases, libraries, applications, and the like.

ESF 260 may use a unique set of metadata to identify services provided by ESF 260, input parameters to the services, and formatting of the input parameters. CAF 270 may also use a unique set of metadata to identify services, input parameters to the services, and formatting of the input parameters. Because generic client proxy 230 may use ESF metadata, for CAF services to be available to a user, CAF metadata must be transformed into the ESF format. That is, system 200 may adapt the CAF metadata into a format that allows the ESF 260 to execute application services provided by CAF. This process will be described in more detail below.

Services provided by CAF 270 may include, for example, application services and entity services. Application services may be services that provide business functionality, such as defining a method for withdrawing money from a bank to facilitate a payment. Entity services may be services that describe objects and data. For example, an entity service may provide access to the bank routing information required for an application service to withdraw money from a bank.

Figure 3:
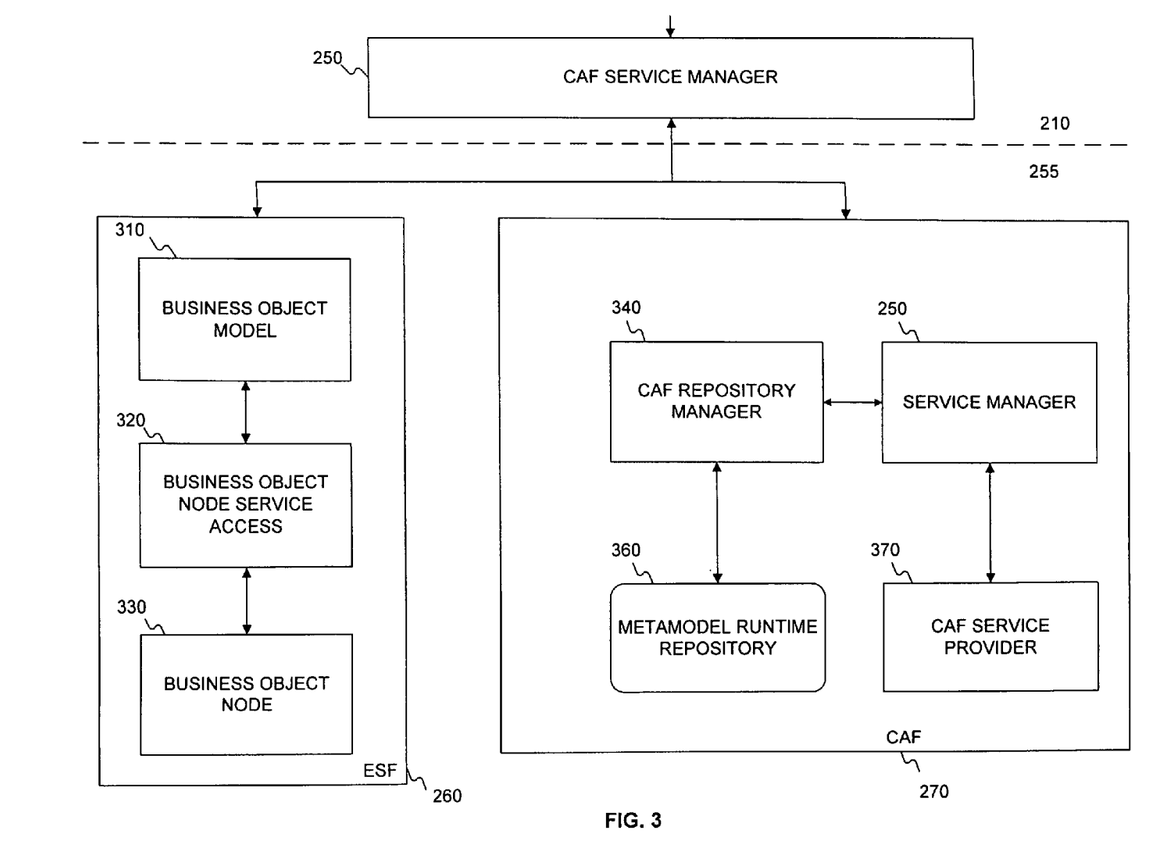
FIG. 3 illustrates a more detailed block diagram of exemplary system 200, consistent with certain aspects related to the present invention.

FIG. 3 illustrates a more detailed block diagram of back-end 255, consistent with an embodiment of the invention. ESF 260 may include, for example, business object model 310, business object node service access component 320, and business object node 330. CAF 270 may include, for example, CAF repository manager 340, service manager 250, metamodel runtime repository 360, and CAF service provider 370.

Business object model 310 may describe business objects 330 using metadata identifying their attributes, interfaces, and relationships with other business objects. A business object node 330 may be a node for a business object. A business object may be a service that performs a business process, such as a service that completes a purchase order. An "object" may refer to a software bundle of variables (e.g., data) and related methods. For example, in object-oriented programming, an object may be a concrete realization (instance) of a class that consists of data and the operations associated with that data. Business object node service access component 320 may be used to lookup, identify, and access business objects.

Frameworks may be developed using different programming languages. For example, ESF 260 may be developed using ABAP (commercially developed by SAP AG), and CAF 270 may be developed using Java. As a result, the metadata for applications running on ESF 260 and applications running on CAF 270 may require different formats and be described with different sets of metadata. In order to expose applications running on CAF 270 to a front-end 210 that uses ESF 260, the metadata for applications running on CAF 270 may be transformed into a format that ESF 260 can utilize. Moreover, a service offered on ESF 260 may be implemented using a plurality of services offered on CAF 270, and vice versa.

CAF repository manager 340 may implement transformation of CAF metadata directly into ESF metadata at runtime. Transformation may be accomplished at runtime by providing CAF repository manager 340, which may retrieve CAF metadata from metamodel runtime repository 360 and translate the retrieved CAF metadata into ESF metadata. Transformation for all CAF services may be accomplished using a generic service manager 250 and CAF repository manager 340, which may be deployed at runtime as part of a CAF software application. CAF repository manager 340 may also determine whether a requested service offered on ESF 270 must be implemented using a plurality of services offered on CAF 260, and vice versa. If a plurality of services are required, CAF repository manager 340 may identify the metadata for each of those services and transform the combination into a format that can be used by ESF 270.

Service manager 250 may manage connections with front-end 210, receive requests from front-end 210, and invoke the appropriate services to handle the requests. For example, service manager 250 may handle execution of create, retrieve, update, and delete procedures provided by CAF service provider 370.

Metadata may be arranged in a model. In object oriented programming, modeling may be the analysis of objects that are used in a business or other context and the identification of the relationships among these data objects. The metadata and metadata model may be stored in a metamodel runtime repository 360. Metadata may be stored in the form of, for example, database tables. The metadata may include information such as the number of nodes in a business object, the name(s) of the nodes, the position of a node in the business object hierarchy, the structure of a node, associations, actions, and default queries on a node.

Metamodel runtime repository 360 may store metadata related to CAF applications as well as ESF applications. The CAF metadata and ESF metadata may be identified and stored to metamodel runtime repository 360 at design time. Metamodel runtime repository 360 may be updated as the applications are changed, such upon release of a new version adding additional services. Additional forms of metamodel storage may also be used, such Eclipse Modeling Framework, which is commercially available from IBM (Armonk, N.Y.).

CAF service provider 370 may control retrieval of CAF services and procedures. CAF service provider 370 may be implemented as a stateless session bean, such as a Java bean. Service manager 250 may provide a request for an application service or procedure to CAF service provider 370. The request may include metadata, such as a Java Naming and Directory Interface name, sufficient to identify a CAF service or procedure. CAF service provider 370 may locate and execute the requested CAF service or procedure, as described in more detail below.

Figure 4:
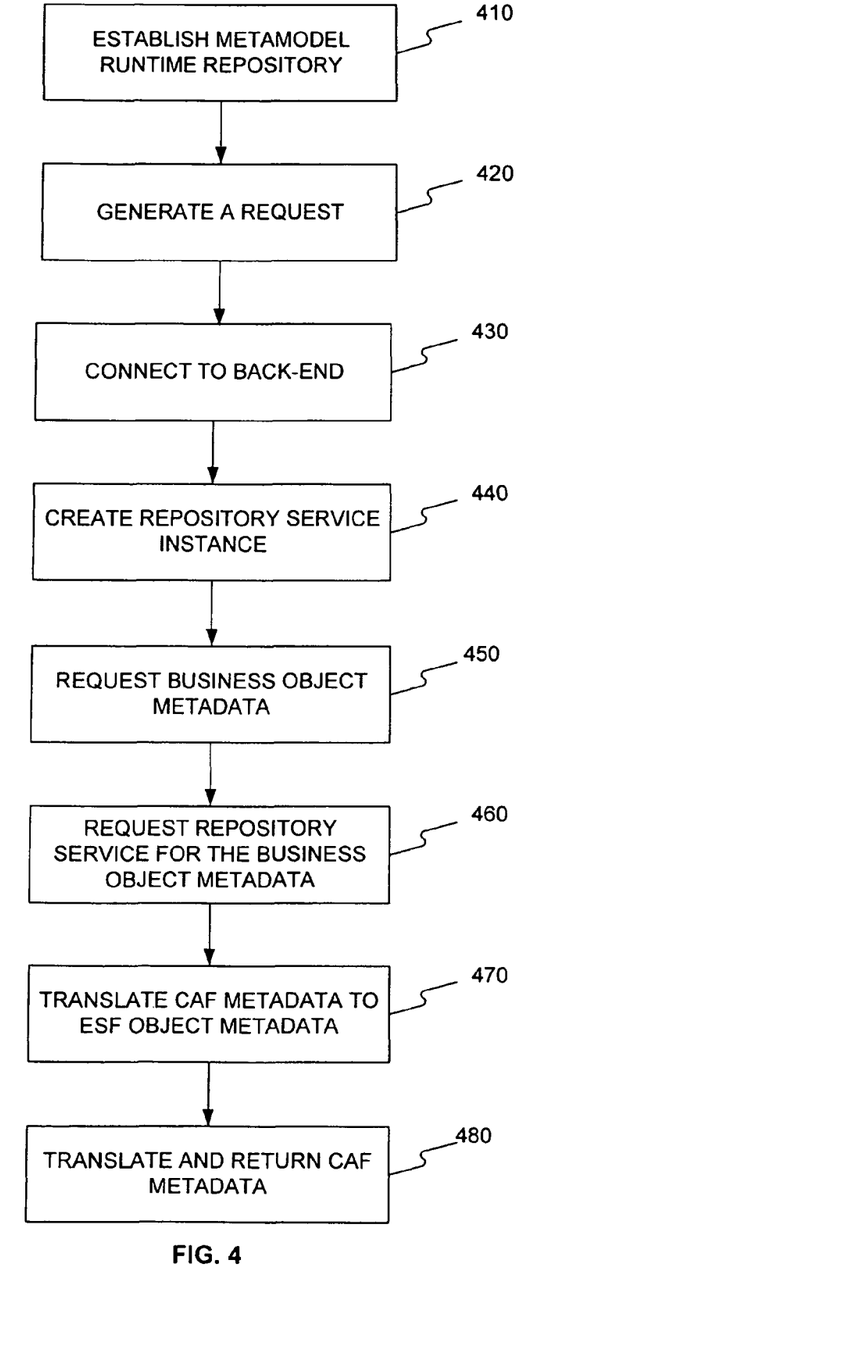
FIG. 4 illustrates a flowchart of an exemplary method, consistent with certain aspects related to the present invention.

FIG. 4 illustrates a flow chart of an exemplary method for transferring metadata from back-end to front-end, consistent with an embodiment of the present invention.

In general, generic client proxy 230 may request CAF metadata for a service from service access layer 240. Service access layer 240 may establish a connection with back-end 255 and provide the request to service manager 250. Service manager 250 may request the metadata from CAF repository manager 340, which may identify and retrieve the appropriate set of CAF metadata for the service from metamodel runtime repository 360. This CAF metadata may be translated into a form that front-end 210, which may be implemented with ESF, can understand and use to invoke the service. The translated metadata for the service may then be returned to generic client proxy 230.

At step 410, metamodel runtime repository 360 may be established, which may include storing ESF metadata for business objects and storing CAF metadata for CAF applications and services. Metamodel runtime repository 360 may be established at design time and provided with CAF 270. Metamodel runtime repository 360 may not store CAF metadata in a format that ESF can use to invoke CAF services. As a result, the CAF metadata must be translated into a form that ESF can use.

ESF metadata may be created for each CAF service and may be stored in metamodel runtime repository 360. The ESF metadata may identify and describe ESF business objects. At runtime, the ESF metadata describing ESF business objects may be used to identify the format needed to convert CAF metadata into ESF metadata. For example, for every "findBy" operation of a CAF service, a "query" operation with the same name may be defined for the appropriate business object node in ESF. A separate "query" may be created for each "findBy" operation that ESF invokes. As further examples, the create, read, update functionality provided by CAF entity services and CAF services may be "mapped" to ESF business object nodes that handle modification and retrieval. Additional custom CAF operations may be provided for CAF services, which may be invoked by creating an action on the corresponding ESF business object node for every custom CAF operation. Moreover, services for setting edit modes of data (e.g., read-only) may be invoked.

As an example of a "query" operation on an application service, assume that a CAF service "AirlineCarrier" may be used to search for an airline carrier. The "AirlineCarrier" service may have CAF metadata to identify a "findByAirline" operation, which may receive a search attribute with the name "airline." In order to transform this CAF service into a form that can be implemented using ESF, a business object may be created in ESF that has the same name as the CAF service—"AirlineCarrier." Inside the ESF business object a "query" may be created with the same metadata as the CAF service, including the "findByAirline" operation. The created "query" should receive the same input parameter(s) as the CAF service, in this example, a search attribute with the name "airline." By adapting the metadata used by the first software application (CAF) into a format that can be used by the second software application (ESF), services for both software applications may be provided with unified naming, input parameters, and formatting of input parameters (metadata).

At step 420, generic client proxy 230 may generate a request for a connection with back-end 255 and may transmit the request to service access layer 240. The request from generic client proxy 230 may be converted by service manager 250 from an enterprise data object to a format compatible with back-end 255, such as a CAF data object.

At step 430, service access layer 240, which may be part of a stateful front-end 210 such as ESF, may connect to back-end 255. The connection may be established with connection parameters that indicate, for example, which service should be used and how to locate the service (e.g., Java Naming Interface Directory name, as described below).

At step 440, service manager 250 may create a repository service instance using the connection parameters. The repository service instance may be used to keep track of requests for metadata from front-end 210 and may be implemented by an ESF business object.

At step 450, generic client proxy 230 may request metadata for an ESF business object. In order to translate CAF metadata into a format that ESF can use to invoke CAF services, the appropriate ESF metadata must first be identified (step 450). Once the format of the ESF metadata is identified, the CAF metadata may be transformed into the necessary ESF metadata.

At step 460, service manager 250 may request the repository instance for the service, including the requested ESF metadata, identified in step 450 from CAF repository manager 340.

At step 470, CAF repository manager 340 may create ESF metadata for the requested CAF service, using the CAF metadata from metamodel runtime repository 340 for the requested service. CAF repository manager 340 may translate the CAF metadata into ESF metadata for a business object using metamodel runtime repository 360. In order to allow CAF services to be available to a front-end 210 that is based on a ESF framework, the CAF metadata may be translated into a format that ESF can execute.

To translate the CAF metadata into ESF metadata, the CAF service name and namespace may be mapped to an ESF business object node name and namespace. Additional parameters, such as a description, may also be defined and mapped for the CAF service.

Every business object descriptor that is created for a CAF service may be linked to the corresponding CAF service provider 430. The "location" field used by CAF services 370 may be set within CAF service provider 370 and stored in, for example, a Java Naming and Directory Interface registry. In this manner, the CAF service may subsequently be located by CAF service provider 430. When the ESF front-end 202 initiates a call based on ESF metadata, such as a business object name, service manager 250 may request that CAF service provider 430 lookup the CAF service from the Java Naming and Directory Interface registry. Service manager 250 may then call the appropriate service identified by CAF service provider 350, as described below.

Transformation may also be accomplished at design time using common metadata. Both the ESF metadata and the CAF metadata may include subsets of common metadata that may be used to transform CAF metadata into ESF metadata, and to transform ESF metadata into CAF metadata. Thus, the CAF metadata may be provided at design time containing all required information for ESF application services. Common metadata may include the entire set of ESF metadata. The CAF metadata may be transferred into ESF metadata by looking up the common metadata 520 that was stored at design time.

At step 480, service manager 250 may serialize the translated CAF metadata into a predetermined format for transmission to front-end 210. The format for transmission may be defined depending on the system architecture and applications. Service manager 250 may then transmit the translated CAF metadata to service access layer 240 at front-end 210.

Figure 5:
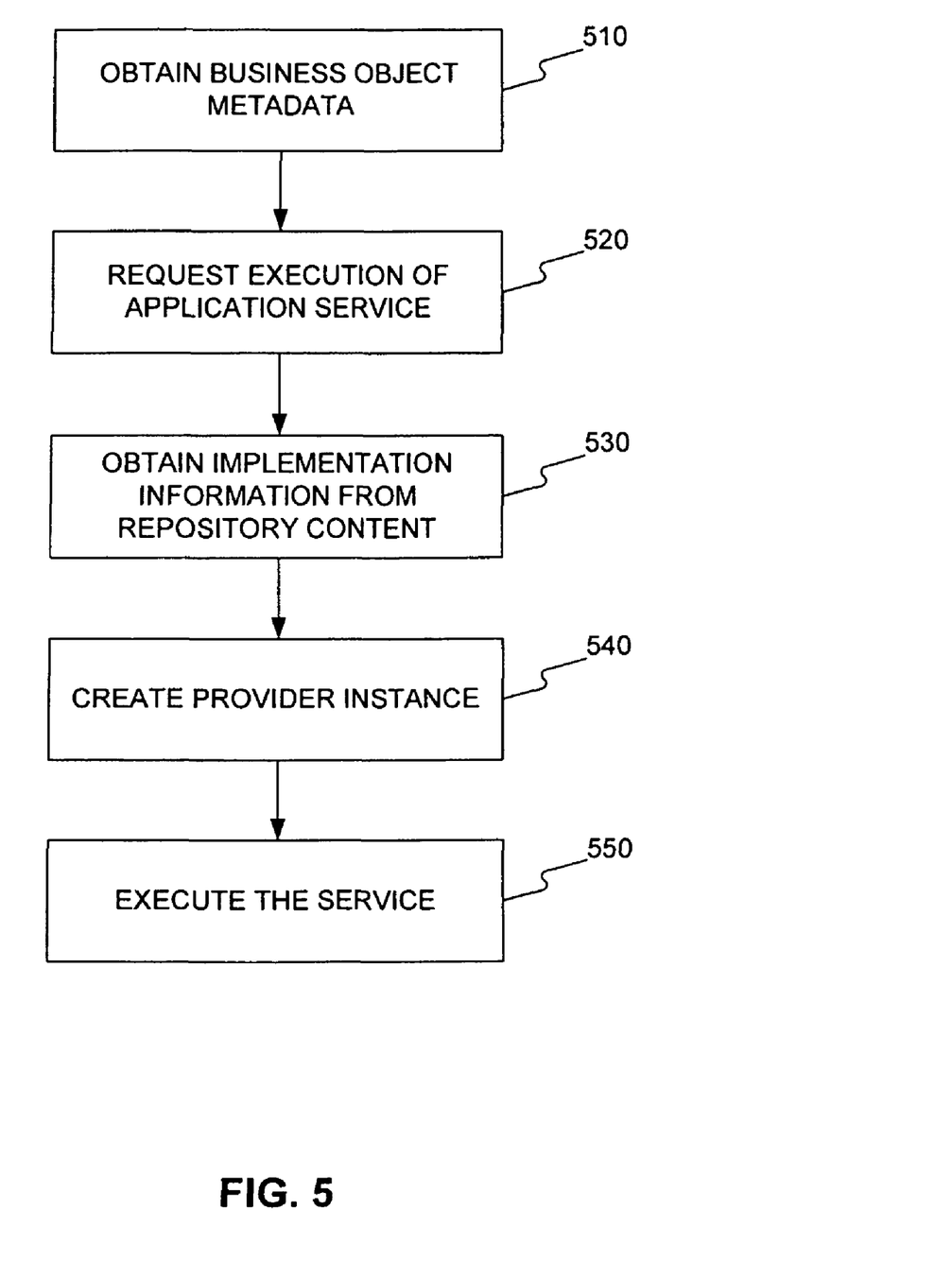
FIG. 5 illustrates a flowchart of another exemplary method, consistent with certain aspects related to the present invention.

FIG. 5 illustrates a flow chart of an exemplary method for executing a service, consistent with an embodiment of the invention. The service may be, for example, a query as described above.

At step 510, front-end 210 has already retrieved the metadata descriptors needed to invoke the CAF service using ESF (see FIG. 4). Generic client proxy 230 may send a request to execute the CAF service, such as a query, using the metadata. The metadata may contain a lookup name for the ESF service. Service access layer 240 may convert the enterprise data object from generic client proxy 230 into a CAF data object prior to transmitting the request to back-end 255.

At step 520, service manager 250 may request the execution of the service from service manager 250. The request may identify the ESF service that corresponds to the CAF service to be executed. For example, the request may include a name for the ESF service, such as "query." From this information, service manager 250 may lookup the corresponding CAF service, in this example "findby," using the Java Naming and Directory Interface, for example. Service manager 250 may send the request for the identified CAF service to CAF service provider 370, which may locate the appropriate service using the provided name and metadata.

At step 530, CAF service provider 370 may locate the requested CAF service using, for example, a Java Naming and Directory Interface name. The Java Naming and Directory Interface name may be provided to CAF repository manager 340, which may lookup the application service in the directory and retrieve the metadata for the application service. The Java Naming and Directory Interface name may identify, for example, the business object provider bean, which may be a stateful session bean. Returning to the example above, if the requested CAF service is a "findby" operation, the business object providing the "findby" operation may be identified. This business object may receive the same input parameters as the CAF "findby" operation.

At step 540, service manager 250 may create a provider instance using, for example, the Java Naming and Directory Interface lookup name, and service provider 430 may execute the application service, such as a query. A provider instance may be an object that is created from a class or process.

When service access layer 240 invokes the appropriate callback method, the call to service manager 250 may identify the application service. The application service may be identified, for example, using a call argument that contains an Information Environment Service Registry name. Information Environment Service Registry stored information that applications can access to identify resources, such as services provided by other applications, that are available. Information Environment Service Registry may contain information about the resources, details about how to access the resource, and contact details for the service provider that can be used to identify the services.

CAF service provider 370 may lookup the application service using the identification information in the Java Naming and Directory Interface registry. CAF service provider 370 may then execute the appropriate method (step 550). The results may be returned to service access layer 240, which may convert these results into enterprise data objects using service manager 250. The enterprise data objects may then be provided to generic client proxy 230 for use with user interface 220.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments.

Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A method for executing, with a first framework, a service provided by a second framework, comprising:
   receiving, at runtime by a first software application provided at a first framework implemented on a first processor from a client implemented on a second processor, a first request to provide a requested service, the first software application being stateful and maintaining a first context of the first software application after providing the requested service;
   determining, by a repository manager of a metamodel runtime repository, that providing the requested service requires executing one or more second services of a second software application provided by a second framework, the second software application being stateless and releasing a second context of the stateless software application after providing the one or more second services, the first software application being unable to directly execute the one or more second services because the first software application lacks one or more of an interface on the second framework, a name of the one or more second services provided by the second software application, a required input parameter for the one or more second services, and a formatting of the required input parameter;
   transforming, at runtime, second metadata describing the one or more second services into first metadata compatible with the first application, the transforming comprising retrieving the second metadata from the metamodel runtime repository, translating the retrieved metadata into a format defined by and usable by the first framework, and creating a business object in the first framework, the business object comprising the translated retrieved metadata for invoking the one or more second services by the first application;
   initiating, by the first framework in response to receiving the first request by the first software application, a second request to access the one or more second services, the initiating of the second request comprising calling the business object in the first framework;
   receiving results of the execution of the one or more second services at the first application; and
   sending the results of the execution to the client from the first application.

2. The method of claim 1, wherein the first framework and the second framework are implemented using different programming languages.

3. The method of claim 1, wherein the translating of the second metadata comprises mapping parameters required to execute the one or more services at the first framework from a second format defined by the second framework to the format.

4. The method of claim 1, wherein the results of the execution of the one or more services are sent to a user interface at the client, which is implemented using the first framework.

5. A computer program product comprising a machine readable storage device tangibly storing a set of instructions which, when executed by a first programmable processor, results in processing operations comprising:
   receiving, at runtime by a first software application provided at a first framework implemented on the first programmable processor from a client implemented on a second processor, a first request for to provide a requested service, the first software application being stateful and maintaining a first context of the first software application after providing the requested service;
   determining, by a repository manager of a metamodel runtime repository, that providing the requested service requires executing one or more second services of a second software application provided by a second framework, the second software application being stateless and releasing a second context of the stateless software application after providing the one or more second services, the first software application being unable to directly execute the one or more second services because the first software application lacks one or more of an interface on the second framework, a name of the one or more second services provided by the second software application, a required input parameter for the one or more second services, and a formatting of the required input parameter;
   transforming, at runtime, second metadata describing the one or more second services into first metadata compatible with the first application, the transforming comprising retrieving the second metadata from the metamodel runtime repository, translating the retrieved metadata into a format defined by and usable by the first framework, and creating a business object in the first framework, the business object comprising the translated retrieved metadata for invoking the one or more second services by the first application;
   initiating, by the first framework in response to receiving the first request by the first software application, a second request to access the one or more second services, the initiating of the second request comprising calling the business object in the first framework;
   receiving results of the execution of the one or more second services at the first application; and
   sending the results of the execution to the client from the first application.

6. The computer program product of claim 5, wherein the first framework and the second framework are implemented using different programming languages.

7. The computer program product of claim 5, wherein translating the metadata comprises mapping parameters required to execute the one or more services at the first framework from a second format defined by the second framework to the format.

8. The computer program product of claim 5, wherein the results of executing the one or more services are sent to a user interface at the client, which is implemented using the first framework.

9. The computer program product of claim 5, further comprising translating the metadata into the format defined by and usable by the first framework, the translating comprising mapping a second framework service name and a second framework namespace of the service to a first framework business object node name and a first framework business object namespace within a first framework business object.

10. The computer program product of claim 5, wherein the first, stateful framework comprises an enterprise services framework.

11. The computer program product of claim 5, wherein the second, stateless framework comprises an composite application framework.

12. A system comprising:

at least one first processor; and at least one computer-readable storage medium storing instructions that, when executed by the at least one processor, cause the at least one processor to perform operations comprising:

receiving, at runtime by a first software application provided at a first framework implemented on the at least one a first processor from a client implemented on a second processor, a first request to provide a requested service, the first software application being stateful and maintaining a first context of the first software application after providing the requested service;

determining, by a repository manager of a metamodel runtime repository, that providing the requested service requires executing one or more second services of a second software application provided by a second framework, the second software application being stateless and releasing a second context of the stateless software application after providing the one or more second services, the first software application being unable to directly execute the one or more second services because the first software application lacks one or more of an interface on the second framework, a name of the one or more second services provided by the second software application, a required input parameter for the one or more second services, and a formatting of the required input parameter;

transforming, at runtime, second metadata describing the one or more second services into first metadata compatible with the first application, the transforming comprising retrieving the second metadata from the metamodel runtime repository, translating the retrieved metadata into a format defined by and usable by the first framework, and creating a business object in the first framework, the business object comprising the translated retrieved metadata for invoking the one or more second services by the first application;

initiating, by the first framework in response to receiving the first request by the first software application, a second request to access the one or more second services, the initiating of the second request comprising calling the business object in the first framework;

receiving results of the execution of the one or more second services at the first application; and sending the results of the execution to the client from the first application.

13. The system of claim 12, wherein the first framework and the second framework are implemented using different programming languages.

14. The system of claim 12, wherein translating the metadata comprises mapping parameters required to execute the one or more services at the first framework from a second format defined by the second framework to the format.

15. The system of claim 12, further comprising means for providing the results of executing the one or more services to a user interface located at a front-end, the front-end being implemented using the first framework.

* * * * *